E. STEVENS.
Improvement in Gates.
No. 128,259.  Patented June 25, 1872.
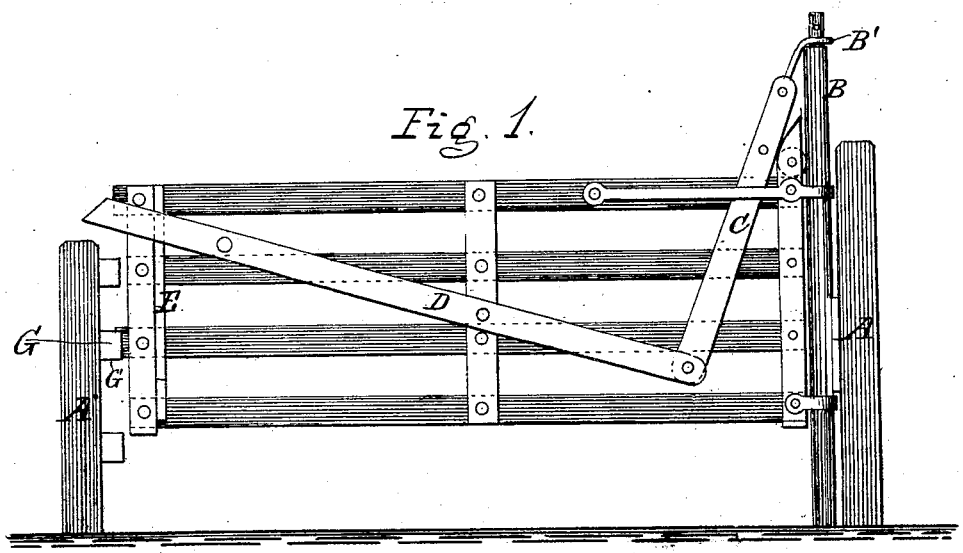
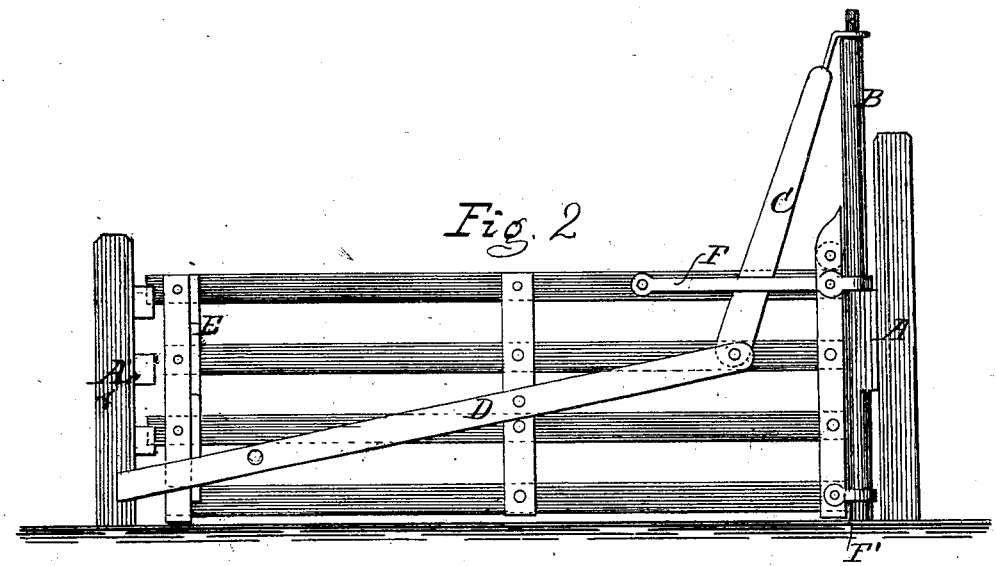
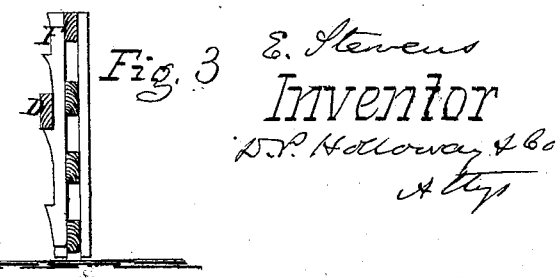

UNITED STATES PATENT OFFICE.

ELISHA STEVENS, OF NEW CARLISLE, INDIANA.

IMPROVEMENT IN GATES.

Specification forming part of Letters Patent No. 128,259, dated June 25, 1872.

Specification describing certain Improvements in Farm-Gates, invented by ELISHA STEVENS, of New Carlisle, in the county of St. Joseph and State of Indiana.

Figure I is a vertical elevation of my improved gate, it being shown in its elevated position. Fig. II is a similar elevation, showing the gate in its lowered position; and Fig. III is an end view, showing the hoisting-lever and the notched bar which holds it in position.

Corresponding letters refer to corresponding parts in the several figures.

This invention relates to that class of gates which are capable of having imparted to them a vertical and a swinging motion; and it consists in certain combinations of some of its parts, whereby the lever which is used for raising the gate is brought in contact with one of its posts in closing, and is thus liberated from the bar upon which it rests, which operation permits the gate to fall to its lowest position.

In constructing gates of this character, I use two posts, A and A', of any desired dimensions, which may be inserted in the earth, or their lower ends may rest in a longitudinal sill, which shall extend from one to the other, and thus support both. To the post A there is bolted or otherwise secured a vertical standard, B, the upper and lower portions of which are rounded for a purpose soon to be described. The extreme upper end of this standard is reduced in size, and upon such portion there is placed a loop or yoke, B', which turns thereon, and which extends downward and is connected to a connecting-link, C, to the lower end of which the lever D is pivoted at one of its ends; this lever being pivoted to any suitable form of gate, as shown in Figs. I and II of the drawing. From the pivoted point last named the lever D extends to the outer edge or beyond such edge of the post A, the object of which arrangement is that, when the gate has been opened while in its elevated position and is allowed to close, said lever shall come in contact with said post, and thus force the lever off from the shoulder upon a bar, E, upon which it rests for the purpose of holding the gate in a more or less elevated position, and allow the gate to fall into the position shown in Fig. II. The gate may be constructed as shown in the drawing, or in any other suitable form; but it should have rollers in that part of the vertical portion which comes in contact with the standard B for the purpose of relieving it of friction; it, also, has loops of metal F F', which are passed around the rounded portion of the standard B, for the purpose of holding the gate in position with reference to said standard. In order that the gate may be held in its closed position when raised to its greatest elevation, one of the rails or bars of which it is composed are allowed to extend outward beyond the vertical cleats upon its free end, in order that it may pass between stops G' upon post A upon being slightly lowered after it has been closed, and thus be prevented from swinging in either direction when elevated, as shown in Fig. I, in which position it is often desirable to have it in summer for the purpose of giving hogs and sheep the free range of different fields, while horned and large animals are not permitted to pass. The gate is raised and lowered by simply raising or depressing the outer end of the lever D, and is held in a more or less elevated position by placing its end in the different notches in the bar E.

I am aware that gates have heretofore been made to have both a vertical and swinging movement, and that such vertical movement has been imparted by a lever similar to the one employed by me. I do not therefore claim the gate, or the method of raising it; but

Having thus described my invention, what I do claim, and desire to secure by Letters Patent, is—

The lever D when extended upon its outer end, so as to come in contact with the post at that end of the gate, and thus relieve the lever from its position on the shoulder upon the bar E, as a consequence of which the gate is lowered, substantially as and for the purpose set forth.

In testimony whereof I have signed my name to this specification in the presence of two subscribing witnesses.

ELISHA STEVENS.

Witnesses:
 ISAAC A. WILDER,
 F. R. TUTT.